Figure 1:
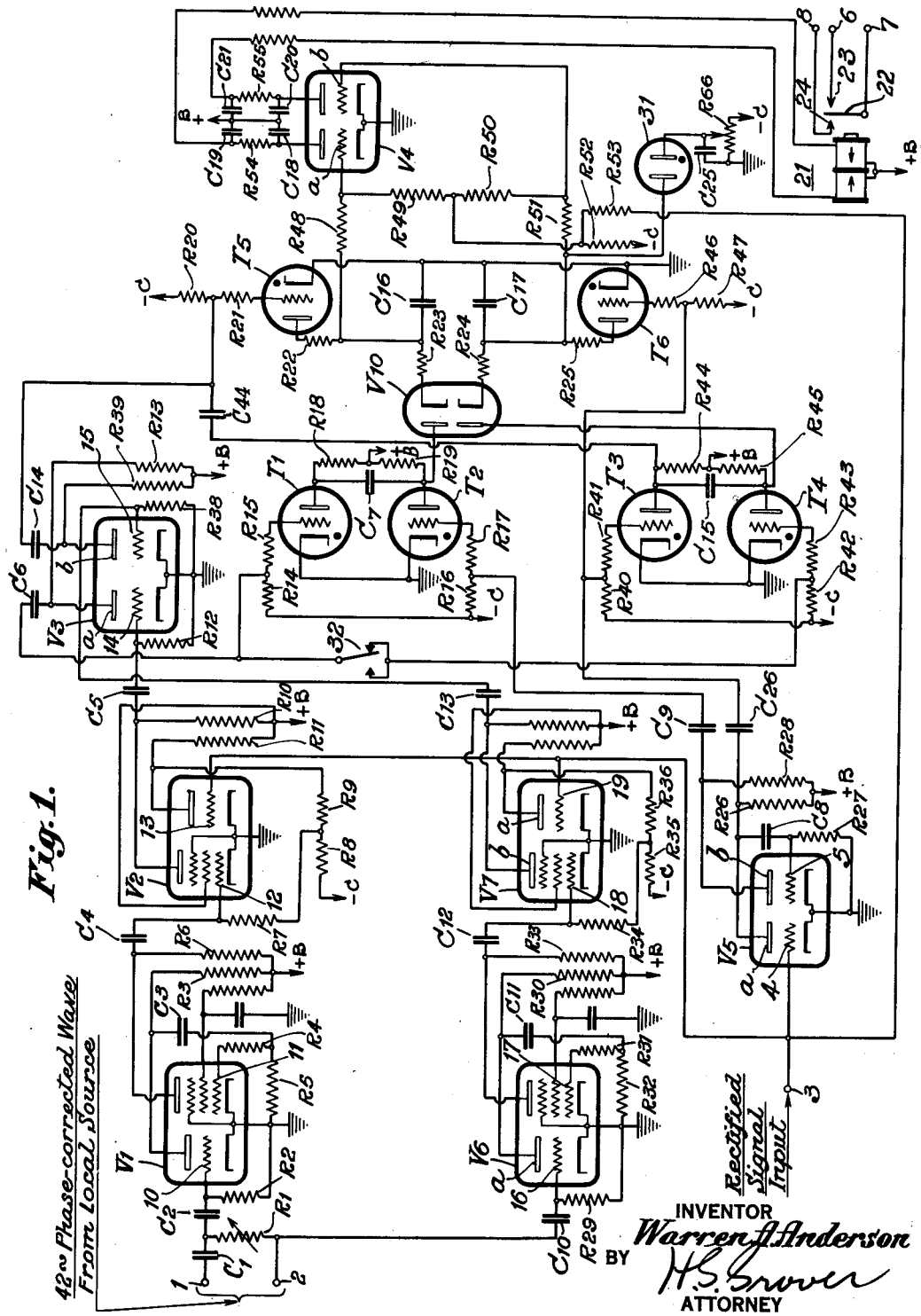

Feb. 2, 1943. W. A. ANDERSON 2,309,622
PHASE CORRECTOR FOR TELEGRAPH SYSTEMS
Filed April 30, 1941 2 Sheets-Sheet 1

INVENTOR
Warren J. Anderson
BY
H. S. Grover
ATTORNEY

Feb. 2, 1943  W. A. ANDERSON  2,309,622
PHASE CORRECTOR FOR TELEGRAPH SYSTEMS
Filed April 30, 1941  2 Sheets-Sheet 2
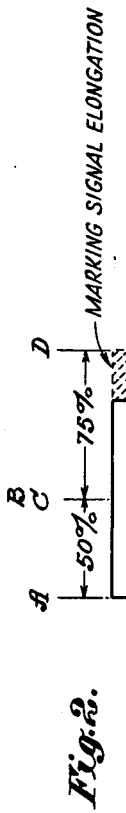
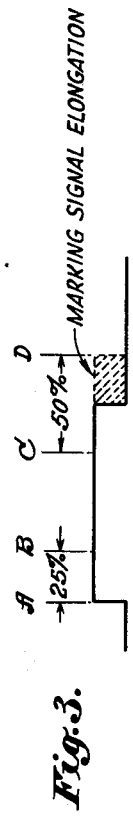
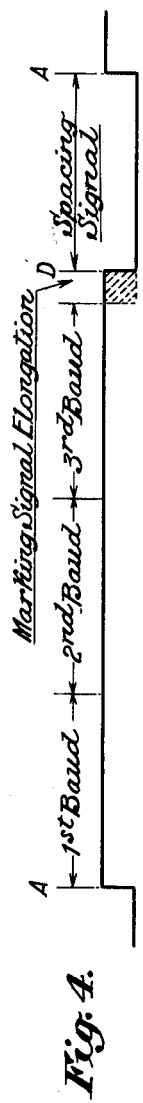
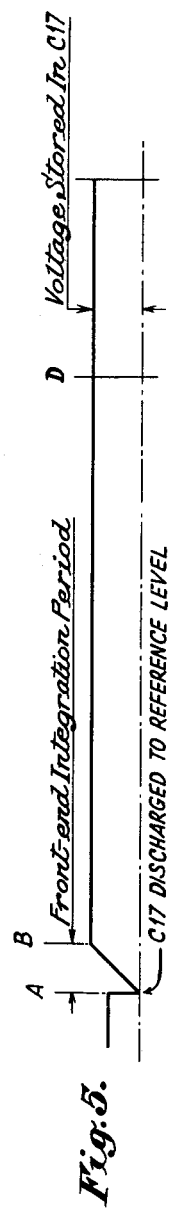
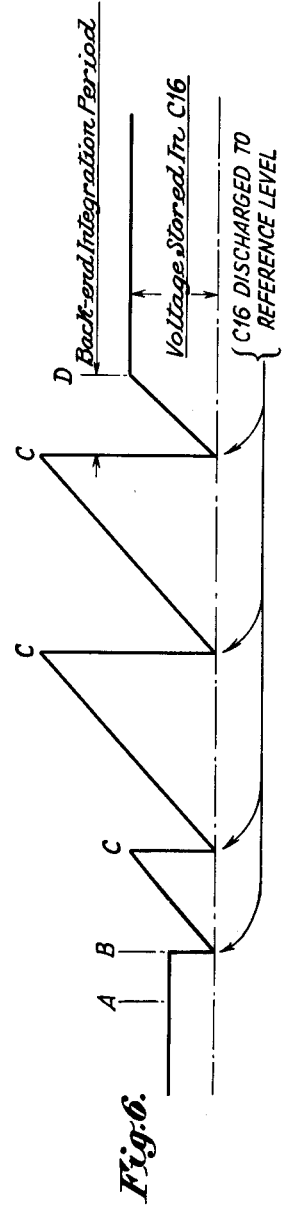
INVENTOR
Warren A. Anderson
BY
H. S. Grover
ATTORNEY Patented Feb. 2, 1943

2,309,622

UNITED STATES PATENT OFFICE 2,309,622

PHASE CORRECTOR FOR TELEGRAPH SYSTEMS

Warren A. Anderson, New Dorp, Staten Island, N. Y., assignor to Radio Corporation of America, a corporation of Delaware Application April 30, 1941, Serial No. 391,077

6 Claims. (Cl. 178—69.5)

This invention relates to improvement in a phase corrector for a telegraph system and has particular reference to a device for maintaining a receiving distributor in phase synchronism with the speed of reception of telegraph signals. Whenever the periodic rate of operation of a receiving device drifts out of step with the rate at which the incoming signals are applied to such a device, it is necessary to produce a corrective action so as to either retard or accelerate the speed of the receiving distributor or other receiving apparatus. In phase correctors such as have been used in the past it has been common practice to obtain a corrective action by the use of the signal elements themselves in combination with locally derived pulses such as may be produced, for example, by means of a local distributor. In the early stages of design of phase correctors a comparison was made between the moments of passage of a distributor brush over a given synchronizing segment and the moments of arrival of the front edges of the marking signal impulses. The distributor speed was accordingly adjusted to compensate for departures from synchronism as determined solely by the front edges of the marking signals and without reference to variations in the elongation or other distortion of said signals.

More recent improvements in the art of phase correction are disclosed in U. S. Patent #2,212,447, granted August 20, 1940 to Richard E. Mathes, and in the following patents which are assigned to the assignee of the instant application:

No. 2,252,364, granted Aug. 12, 1941, on application Serial No. 316,458, filed January 31, 1940, by Gilbert R. Clark; Nos. 2,258,151 and 2,258,152, granted Oct. 7, 1941, on applications Serial Nos. 326,902 and 326,903, both filed March 30, 1940 by Eugene R. Shenk.

It is an object of my invention to improve upon the structures and methods of operation disclosed in the foresaid cases of Mathes, Clark and Shenk by providing a more dependable arrangement, the operating characteristics of which are not seriously affected by normal distortion of signals.

It is another object of my invention to provide means for measuring two relatively short time intervals one of which elapses between the front edge of a marking signal and a local impulse, and the other of which elapses between a second local impulse and the end of the marking signal, where the two said local impulses occur equidistant from the normal center of a time allotment for dot unit impulse reception, and where a comparison of the two said time intervals may be utilized for phase correction purposes.

It is still another object of my invention to provide a phase correction circuit having output terminals which may be connected to any one of a number of different utilization devices, particularly those which might be used in a multiplex telegraph system or in a simplex telegraph system, all of which devices are to be maintained in synchronism with the periodic rate of reception of incoming signals.

My invention will now be described in detail, reference being made to the accompanying drawings in which Figure 1 shows diagrammatically a preferred circuit arrangement including the essential elements in combination for carrying out the invention; and Figs. 2 to 6 inclusive are plots of electrical impulses which occur in various parts of the circuit arrangement. These plots are all drawn to the same horizontal time scale in order to show a correlation of essential operations in response to signals.

In the following description of the circuit arrangement of elements referenced V1, V2, V3, etc., will be understood to be vacuum discharge tubes of one type or another. Elements referenced T1, T2, T3, etc., will be understood to be discharge tubes of the gas-filled ionization discharge type. These tubes are conventionally indicated by means of a black spot in the discharge zone. Resistors wherever referenced will be given numbers of the series R1, R2, R3, etc., while capacitors will be referenced C1, C2, C3, etc. Specific reference to each of the tubes, resistors, and capacitors will, therefore, for the sake of brevity, be frequently made by their identifying symbols alone.

A comprehensive idea of the circuit arrangement and its functions will first be given by pointing out that the various tubes and their circuit connections are arranged to make comparisons between two capacitive charges stored in a pair of capacitors C16 and C17. If an accelerating correction is to be provided because the local impulses are retarded in relation to the reception of the incoming signals, then the charge stored on C17 will be greater than that stored on C16, with the result that, during the next succeeding spacing signal, when these charges are caused to control the respective triode grids $b$ and $a$ of tube V4, then the left hand winding of differential relay 21 will be so energized as to draw the relay armature 22 over to contact 23. On the other hand, if the local impulses are to be retarded because of the delay in reception of the incoming signals, then capacitor C16 will have received a greater charge than C17 and during the next succeeding spacing signal a greater current flow in the left side than in the right side of V4 will cause the relay 21 to throw its armature 22 over to the contact 24. The manner in which the correction control circuits connected to terminals 6, 7 and 8 may be utilized will be well understood by those skilled in the art.

Referring now in more detail to Fig. 1, I show a pair of input terminals 1 and 2 which receive a constant frequency alternating current from a local source of oscillations the phase of which may be rotated by means of the phase correction circuit, which is the subject matter of this invention. I also show a terminal 3 to which is applied negative impulses with respect to ground, these impulses corresponding to the marking elements of the received signals.

In describing Fig. 1 a certain sequence of operations will be outlined which takes place during the reception of a single normal length baud arriving at the receiving point in proper phase, so that no correction is necessary. The operation of the system under various conditions and when the marking signals are of different lengths will then be explained.

Rectified signal voltage produced in the signal control unit (not shown) furnishes a cut-off bias during marking periods by applying a negative potential at terminal 3 which is caused to influence grid 4 in V5, grid 13 in V2, grid 19 in V7 and grids a and b in V4.

At the time of occurrence of the start (hereinafter designated A) of a marking pulse, a sharp rise of voltage on the anode a of V5 produces a positive pulse by differentiating a rectangular wave through capacitor C26. This pulse is applied to the grids of gaseous tubes T3 and T6. The application of the grid control potentials just mentioned is made through grid resistors R41 and R46 respectively. An ionization discharge takes place in both of the tubes T3 and T6, but in T6 it is only momentary because its anode receives its positive voltage solely from a charge previously stored in the capacitor C17. As soon as this capacitor becomes discharged to below the extinction voltage of tube T6 (say 16 volts, for example), the discharge in T6 ceases.

The discharge in T3, however, continues until it is extinguished in a manner presently to be described. The anodes of T3 and T4 are intercoupled through C15 so that when either of these tubes ignites, a surge impulse across C15 lowers the potential on the anode of the other tube momentarily below the point of extinction of the discharge therein. In the tube which is extinguished there ceases to be a potential drop through the appropriate one of the resistors R44 or R45, and the anode voltage is, therefore, raised to the full value of the +B source.

In accordance with the preceding paragraph the discharge in T3 causes T4 to be extinguished by commutation through the medium of C15 and the anode potential of T4 rises to full +B value. This +B voltage then starts charging C17 through one section of the double diode V10. This charge will continue until the occurrence of a local impulse (hereinafter termed "B"), which ignites T4. The charging period for C17, therefore, represents a so-called front edge integration period extending from the moment A to the moment B. A second local impulse, (hereinafter termed "C") is used to mark the commencement of a back edge integration period terminating at the moment D at the back edge of the marking signal. The impulses B and C occur normally at equal intervals preceding and following the normal center of a baud. Their timing is primarily controlled by the phase corrected local oscillations fed to the terminals 1 and 2, but the timing of the B-pulse anticipates that of the C-pulse in accordance with the adjustment of the variable resistor R1 in relation to the capacitance of C1, where R1 and C1 in combination constitute a phase shifting network.

The method of deriving and utilizing the B and C pulses will now be further explained. The voltage having the 42 cycle frequency of the local source is applied across C2 to the grid 10 in the triode section of V1 where it is amplified. Correspondingly the same voltage is applied across resistor R29 through capacitor C10 to the grid 16 in the triode section of V6 where it is amplified. V6 has functions corresponding to those of V1. The only difference in their operation is in the phasing of the voltages applied thereto. Resistor R1 is preferably adjusted so that the signaling baud will be divided into three approximately equal intervals by the B and C pulses.

The pentode section of V1 is controlled by output from the triode section thereof. The pentode section produces a rectangular wave shape in its anode circuit which is applied across resistor R6 and is caused to control the grid 12 of V2 by means of surge impulses through C4 and R7 on the occurrence of the steep fronts of the square wave. The output from the pentode section of tube V2 consists, therefore, in surge impulses which are applied through C5 and R12 to the grid 14 of V3. These applications of the surge impulses are, however, limited to marking periods because only during the marking periods is the grid 12 biased above cut off. Its biasing circuit is one which includes the potentiometer elements R8 and R9 in circuit with the anode of the triode section in V2. It will be recalled that this triode section is biased to cut-off in the presence of a marking signal and consequently the rise of its anode voltage to full +B value produces a potential drop in R9 and R8 sufficient to render the pentode section of the same tube conductive. The shaping and limiting action of V2 will, therefore, be apparent to those skilled in the art. Tube V3 reverses both the B-pulses and the C-pulses, where grid 14 is controlled by the B-pulses and grid 15 is controlled by the C-pulses.

The functions of V6 and V7 in translating the local oscillations into C-pulses will be apparent from the foregoing description of V1 and V2. However, the operation will be briefly outlined as including the control of the triode section of V6 by application of the local sine wave to the grid 16, so that the amplified current through R30 and the anode a may be used to control the grid 17 in the pentode section of V6, coupling thereto being made through C11 and R31. This pentode section of V6 produces a rectangular wave and C12 and R34 form the C-pulses to control the grid 18 of V7 but only during the presence of a marking signal. This is true because the grid 19 in the triode section of V7 is biased to cut-off during the presence of a marking signal. Therefore, the rise of potential on the anode a in V7 produces a voltage drop through R36 and R35 such as to reduce the negative bias on the grid 18 sufficiently to cause the pentode section of this tube V7 to respond to the impulses formed in the circuit of C12. The surge impulses derived from the pentode section of V7 are impressed across C13 to the grid 15 in the tube V3. Reversal of these impulses is then obtained in that output circuit of V3 which includes its anode $b$.

The B-pulses are now impressed across C6 and through the switch 32 to a tap on the negative bias potentiometer consisting of elements R42 and R43, thus controlling the grid in T4. Simultaneously the grid of T1 is also controlled by these B-pulses fed to a tap on potentiometer R14, R15. Likewise the C-pulses delivered through R39 to the output circuit including anode $b$ in V3 are impressed through C14 to a tap between the elements R20 and R21 of a potentiometer in the grid circuit of T5. Thus the surge impulse which occurs at the moment B causes T1 and T4 to ignite, whereas the surge impulse which occurs at the moment C causes T5 to ignite.

I have already explained that the front-end integration period is measured by a charge built up on C17, and that this charge starts after a previous charge has been wiped out at moment A by the brief ionization of T6. This front-end charging period is co-extensive with a non-conductive state in T4 and is terminated by the B-pulse, the effect of which is to ignite T4 and to extinguish T3.

The back-end integration period is measured in accordance with a somewhat similar process, but is complicated by the fact that it must start with a C-pulse which immediately precedes the back end of a marking signal the length of which may be either one baud or a plurality of bauds. C16 may, therefore, be charged and discharged repeatedly during a long marking signal, but only the charge which is stored thereon between the last C-pulse and the moment D, (at the back edge of the marking signal) will be used in the comparison of the integrating periods. The momentary ionization of T5 provides a discharge path for C16 such as to reduce the charge thereon down to a reference level (say, 16 volts), which is just below the extinction voltage of T5.

Two sources of grid excitation pulses are used for ionizing T5, one being the C-pulse which is caused to surge through C14, and the other being an effect of the first B-pulse which appears during the lapse of a marking signal. This first B-pulse is the one which ignites T4 and extinguishes T3 by commutation across C15. The sudden increase in anode voltage in T3 produces a surge impulse through C44 and the grid resistor R21, thus causing T5 to ignite. By discharging C16 through T5 both at the moment of the first B-pulse, and also in response to each successive C-pulse, a risk is avoided where the corrective action might fail due to the splitting of the marking signal. In such case a spurious spacing condition might appear just at the moment when the C-impulse is to be rendered effective. This would cause two or more charges to be superposed on C16.

I have stated that in response to the B-pulse a voltage rise takes place on the anode $a$ of V3 which produces a surge impulse through capacitor C6 and causes tubes T1 and T4 to ignite. This impulse affects the voltage drop across resistors R14 and R15 and also across resistors R42 and R43. The outer terminals of R15 and R43 are connected to the grids of the tubes in question, whereas the outer terminals of resistors R14 and R42 are connected to the negative terminal of a grid biasing source indicated as $-C$.

T1 having been ignited by the B-pulse the reduction of its anode voltage upon ignition produces a surge impulse through C7 and causes tube T2 to be extinguished. The anode of T2 then rises to full $+B$ value and C16 starts charging. Successive charges on C16 (one being between the first B-pulse and the next C-pulse; and other charges being between successive C-pulses within the lapse of a single marking period) are wiped out by the ignition of T5, as previously explained. The true back-end integration period is measured, however, by a charge stored in C16 which started at the last C pulse and ended at the moment D, at the end of the marking signal. The charge is stored by virtue of the unidirectional passage of current through the upper section of the diode V10. This charge is conducted from the upper cathode in V10 through R23 to one terminal of C16, the other terminal being grounded.

Removal of the rectified signal causes the anode $a$ of V5 to draw current. Due to the selective action of the network R26, C8, R27 a short sharp pulse is applied to the grid 5 of V5 at the moment D when transition occurs between mark and space. Under control of grid 5 in V5, which has been passing current, a momentary cut off condition occurs producing a positive pulse on the anode $b$ of V5. This pulse (termed the D-pulse) controls the grid of T2 through capacitor C9 and resistor R17.

The D-pulse ignites T2 which extinguishes T1 by a commutation. The anode of T2 is reduced to the tube-drop voltage which is below the voltage acquired by capacitor C16 during its charging period, but the latter cannot discharge through V10. The back end integration period is thus represented by a voltage stored in C16 for utilization in the ensuing space period. This voltage is substantially proportional to the time period between the last C pulse in the mark and the end thereof.

The way condensers C16 and C17 are charged and discharged upon receipt of single and multiple marks may be summarized as follows:

The start-of-mark A pulse discharges the front-end condenser C17 to reference level by firing T6. This pulse simultaneously fires T3 which quenches T4 and starts the condenser to recharge. Firing of T3 discharges condenser C44. This latter action has no immediate effect, but it places the circuit in condition to discharge back-end condenser C16 when the first front-end A pulse occurs. The first front-end A pulse fires T4 and stops the charging of front-end condenser C17. All subsequent B pulses in multiple baud marks, as in Fig. 5, do not affect the front-end condenser C17, as T4 remains conducting after the first baud, being quenched by the previous start-of-mark A pulse. The firing of T4 also quenches T3 and this fires T5, because of the drop in R20 produced by the charging of condenser C44. Back-end condenser C16 then discharges to reference level. This first B pulse also fires T1, the previous end-of-mark D pulse having quenched it by firing T2. The firing of T1 then quenches T2 and condenser C16 immediately starts charging. The front-end B pulses subsequent to the first one in multiple baud mark (Fig. 6) cannot discharge the back-end condenser C16, as T3 remains quenched until the next start-of-mark pulse A. The first and all other back-end C pulses in the marks discharge condenser C16 to reference level by firing T5 by the drop from the charging current of condenser C14. Condenser C16 starts immediately to recharge because the first front-end B pulse quenched T2 by firing T1 and it remains quenched until the occurrence of the next end-of-mark pulse D. The back-end C pulse affects only condenser C17, since it controls only thyratron T5. Finally, the end-of-mark D pulse stops the charging of condenser C16 by firing T2.

Fig. 6 shows a time graph of the charging and discharging operations on C16 during a marking signal which persists for a period of three bauds. This may be compared with the charging of C17 as shown in Fig. 5, both graphs being drawn to the same time scale.

The voltages stored in condensers C16 and C17 are applied through resistors R48 and R51 respectively to the two grids a and b of output tube V4. This storage continues during a spacing period. Tube V4 is unblocked during the spacing period by removal of the rectified signal bias so that the stored voltages on the capacitor C16 and C17 may be effective. The two sections of the tube V4 will draw plate current in proportion to the voltages stored on their respective condensers C16 and C17. In the assumed case, the currents in the two anode circuits of V4 will be equal and the same amount of current will flow in the two halves of differential relay 21, the windings of which are in these respective anode circuits. The tongue 22 of relay 21 will not be moved from its neutral position. The phase rotating device which is interposed between the local source of 42-cycle impulses and the phase correcting terminals 1 and 2 will, therefore, not be disturbed.

When a frequency difference exists between the transmitting and receiving frequency standards, or if the ether path introduces changes in the length of the signal baud, then the voltages as stored on condensers C16 and C17 will not be equal, and hence the voltages applied to the grids a and b of tube V4 will be such as to cause the anode current in one section to exceed that in the other. The differential relay 21 will then be actuated and the throw of its armature 22 to one side or the other will close the proper circuit for accelerating or retarding the phase-rotating device until the voltages on C16 and C17 are again equal.

The integrating network in the anode circuit of the output tube V4 prevents the operation of the differential relay on single isolated voltage differentials on C16 and C17 and, therefore, produces smoother operation. This network comprises series resistors R54 and R55 and shunt capacitors C18, C19, C20 and C21.

A neon lamp 31 is connected in shunt with the capacitor C17 and is used to guard against an excessive charge on this condenser. Such an excessive charge might occur when a false start is made in charging this condenser, as, for instance, when caused by a splitting signal. The split will produce a spurious A-pulse which will ignite tubes T3 and T6. C17 will then be discharged to the reference voltage whereupon T6 will self-extinguish. C17 will then start charging and continue until the next B-pulse occurs. The voltage on C17 would, therefore, rise continuously even during the spacing period when the output tubes are unblocked if the marking period was of one baud length. This would result in spurious correction were it not for the operation of the neon tube 31. The point of breakdown of this tube is adjusted by means of a potentiometer R66. In order to adjust the potentiometer R66 properly a momentary break switch 32 is introduced in circuit between C6, R42 and R43. The effect of a splitting signal may be simulated by artificially interrupting the grid control of T4 so as to prevent its normal ignition. The momentary break switch 32 is used for this purpose. The voltage across C17 will then rise to an excessively high value. By oscilloscope observation R66 may then be adjusted so that the voltage across C17 will be dropped to the normal average and excessive correction will not take place.

It is desirable to discuss at this point the theory and principles of phase correction as applied to the synchronization of receiving telegraph equipment, and to consider the practical tolerances within which the sensitivity of the phase corrector should be adjusted.

Richard E. Mathes, in his copending application Serial No. 376,870, filed January 31, 1941, has described a system for rotating the phase of a sine wave through any angle greater or less than 360° for purposes of synchronizing a local source with a remote source. Other systems of phase rotation are, however, known in the art. Assuming, therefore, that a local oscillator is provided which delivers impulses at a convenient synchronizing frequency, say 42 cycles per second, then the output from such as oscillator may be fed through a phase rotator and thence to the terminals 1 and 2 of Fig. 1. By the aid of the correction circuit shown completely in Fig. 1 the orientation of the phase rotating device may be brought about so that the output from the phase rotator shall at all times be maintained in synchronism with a train of received signals from a remote transmitter. The phase corrected source may be applied not only to the terminals 1 and 2, but also to any synchronous motor which drives a receiving commutator or other apparatus used at the point of reception of telegraph signals.

The sensitivity of my improved correction unit depends upon the adjustment of the phase differentiating network C1—R1, which controls the separation between the B-pulses and the C-pulses. These pulses are derived from the single-phase sine wave energy applied to terminals 1 and 2. The positioning of the B-pulse and the C-pulse about the center of the baud, on the other hand, is a function of the phase rotating device which operates under control of the relay 21. This operation tends to equalize the charges on C16 and C17. I have found, however, that the optimum spacing between the B-pulse and the C-pulse is one wherein these pulses divide an elementary baud interval into three equal parts. The reason for this is explained as follows, reference being made to Figs. 2 and 3, where a marking signal of a single baud length is graphically represented.

Let it be assumed first that the B-pulse and the C-pulse are substantially coincident in the center of a normal baud and that a signal elongation of 25% of the baud takes place. This elongation is indicated by cross-hatching. Then the resultant front end integration period will be measured by the interval A—B amounting to 50% of a normal baud, whereas the back end integration period will be measured by the interval C—D which is a total of 75% of a normal baud. In this case the voltages stored in C17 and C16 respectively are in the ratio 2:3.

Now, let the local pulses be shifted so that the time of their occurrence is as shown at B and C in Fig. 3. Assume also that the same 25% elongation of the signal occurs. In this case it will be seen that the back end integration voltage is twice as large as the front end integration voltage. It can, therefore, be said that the closer the locally generated pulses are positioned with respect to the start and finish of the normal baud, the more effective will be the changes from normal in producing large correction differentials. However, other difficulties arise in attempting to shorten the integration periods too much. Firstly, the stored voltages on capacitors C17 and C16 become inadequate to properly operate the two sections of the output tube V4. Secondly, a division of the "baud" into approximately three equal parts by the B-pulse and the C-pulse has the effect of minimizing spurious performances of the correction circuit under conditions of excessive elongation or excessive curtailment of the marking signals. The maximum time interval between the B-pulse and the C-pulse should not be so great as to extend beyond the limits of an expected shrinkage in the duration of a signal dot. Also the minimum time interval between the B-pulse and the C-pulse should not be so small as to be less than the maximum expected elongation of the signal.

These considerations are demonstrable by plotting the B-pulse and the C-pulse at various points along a graph of the marking baud, and by assuming certain departures from synchronism such as would cause either the B-pulse alone or the C-pulse alone to appear within the interval of a marking baud. The storage of incorrect and incomparable voltages in C16 and C17 under these abnormal conditions would be obvious. There is, nevertheless, a permissible range of adjustment of the spacing between the B-pulse and the C-pulse which affects the sensitivity of the corrector circuit under various practical operating conditions, and this range of adjustment can be used advantageously.

I claim:

1. In a synchronizing system for telegraph apparatus, a local source of sine waves, a corrector circuit arrangement having input terminals fed from said source through a phase rotating device, a phase splitting network connected to said terminals, a signal input terminal for said corrector circuit arrangement, two capacitors each receptive of charges to be mutually compared for producing a synchronizing effect upon said phase rotating device, means including three pulse generators A, B, and C for determining the charging times of said capacitors, said generators being so arranged and connected that generator A is receptive of signals from said signal input terminal and defines the starting moment of the charge on one of said capacitors and also the finish moment of the charge on the second of said capacitors, generator B defines the finish moment of the charge on the first said capacitor, and generator C defines the starting moment of the charge on the second said capacitor, means for so adjusting the parameters of said phase splitting network that generators B and C are caused to separate the charging times of the two said capacitors by a time interval equal to substantially half the sum of said charging times, a differential relay responsive to inequalities between the charges on said capacitors, and contacts operable by said relay for closing either of two circuits in said corrector circuit arrangement thereby to actuate said phase rotating device in either direction.

2. Apparatus for synchronizing the sine wave output from a phase rotator with a train of telegraph signals, comprising a phase corrector circuit arrangement of the type which includes capacitive storage means for comparing the lengths of two time intervals having a significance such that synchronism of said sine wave output with said signals is denoted by equality of said time intervals, means in said phase corrector circuit arrangement for starting a charge on one unit of said storage means at the front edge of a marking signal and for terminating a charge on a second unit of said storage means at the back edge of said marking signal, a phase splitting network receptive of said sine wave output from the phase rotator, two pulse generators so controlled by said network that one of them is caused to deliver a control pulse for terminating the charge on the first said storage unit and the other of said pulse generators is caused to deliver a control pulse for starting the charge on the second said storage unit, means for so adjusting said phase splitting network that it causes the action of the first said pulse generator to anticipate that of the second said pulse generator by substantially one third of a cycle of said sine wave, and a utilization device including a differential relay operable in accordance with the compared charges on said storage units for performing the synchronizing function of said apparatus.

3. Apparatus according to claim 2 and including means for discharging the respective units of said capacitive storage means down to a predetermined reference voltage at the inception of each of the two time intervals to be compared, and further means for discharging the second unit of said storage means to the same reference voltage in response to the pulse delivered by that one of said generators which terminates the charge on the first said storage unit.

4. Apparatus according to claim 2 and including a gaseous discharge tube in shunt with one of the units of said capacitive storage means and having a breakdown resistance value such as to be ionizable only when the charge on said unit exceeds a usable value.

5. A phase corrector circuit arrangement having a pair of input terminals adapted to receive an adjustably phased sine wave, a phase splitting network connected to said terminals, a rectified signal input terminal, three discharge tube systems A, B, and C, of which system A is under control of signals impressed on said signal input terminal, and systems B and C are respectively under control of leading and lagging phase derivatives of said phase splitting network, each of said systems constituting devices for producing brief surge impulses, four gaseous discharge tubes arranged in two pairs wherein the anodes of each pair are capacitively intercoupled in such manner that the ignition of one tube causes its mate to be extinguished, ignition means for said gaseous tubes so constituted that one of said tubes is ignited by a surge impulse from system A at the front end of a marking signal, a gaseous tube of the other pair is ignited by a surge impulse from system A at the back end of said marking signal, and the mates to the two gaseous tubes last mentioned are ignited by a surge impulse from system B, electrical means under control of said gaseous discharge tubes in cooperation with said system C for differentiating between two time intervals the first of which elapses between the front end of said marking signal and the moment of ignition of said tubes which are controlled by system B, the second time interval being that which terminates at the back end of said marking signal, responsive means being provided for defining the start of said second time interval under control of a surge impulse from system C, and relay means responsive to said differentiating means whereby the phase of said sine wave is adjusted to the cadence of said signals.

6. In a synchronizing system for receiving telegraph apparatus, the method of rotating the phase of a locally generated sine wave which comprises splitting the phase of said sine wave to produce two components having a phase difference of substantially 120°, developing two trains of surge impulses of the same frequency as said sine wave, each train being synchronized by one of said components respectively, measuring the time lapse between the arrival of the front edge of a marking signal and the next succeeding one of said impulses in the leading train, measuring the time lapse which starts with an impulse of the trailing train next preceding the arrival time of the back edge of said marking signal and ends with that arrival time, electrically comparing the lengths of said time measurements, and utilizing the results of said comparison to rotate the phase of said sine wave forwardly and backwardly.

WARREN A. ANDERSON.